United States Patent [19]

Neuffer et al.

[11] Patent Number: 5,293,150
[45] Date of Patent: Mar. 8, 1994

[54] CIRCUIT ARRANGEMENT OF AN ANTI-THEFT ALARM

[75] Inventors: Klaus Neuffer, Böblingen; Helmut Grickscheit, Sindelfingen, both of Fed. Rep. of Germany

[73] Assignee: Mercedes-Benz AG, Fed. Rep. of Germany

[21] Appl. No.: 912,278

[22] Filed: Jul. 13, 1992

[30] Foreign Application Priority Data

Jul. 13, 1991 [DE] Fed. Rep. of Germany ....... 4123270

[51] Int. Cl.⁵ .......................................... B60R 25/10
[52] U.S. Cl. ................................... 340/426; 340/471
[58] Field of Search ..................... 340/426, 425.5, 428, 340/429, 430, 438, 463, 468, 471, 475; 307/10.2, 10.8; 180/287

[56] References Cited

U.S. PATENT DOCUMENTS

| | | | |
|---|---|---|---|
| 3,464,061 | 8/1969 | Dollase | 340/471 |
| 3,882,449 | 5/1975 | Bouchard et al. | 340/471 |
| 4,227,174 | 10/1980 | Belcher et al. | 340/471 |
| 4,302,748 | 11/1981 | Gant | 340/471 |
| 4,325,007 | 4/1982 | Prohaska et al. | 340/471 |
| 4,480,249 | 10/1984 | Heidman, Jr. | 340/426 |
| 4,821,018 | 4/1989 | Leistenschneider et al. | 340/475 |

FOREIGN PATENT DOCUMENTS 3630448 9/1987 Fed. Rep. of Germany .
3810806 7/1989 Fed. Rep. of Germany .

Primary Examiner—Brent Swarthout
Attorney, Agent, or Firm—Evenson, McKeown, Edwards & Lenahan

[57] ABSTRACT

A circuit arrangement for an anti-theft alarm for vehicles which emits optical signals to the outside by means of the driving direction indicator lights of the vehicle and also permits driving direction changes to be displayed. Actuation of the indicator lights is cancelled by the anti-theft alarm for the duration of the direction flashing indication.

11 Claims, 2 Drawing Sheets

CIRCUIT ARRANGEMENT OF AN ANTI-THEFT ALARM

BACKGROUND AND SUMMARY OF THE INVENTION

The invention relates to a circuit arrangement of an anti-theft alarm for a vehicle which, after an activation of the alarm by signal generator, intermittently emits optical alarm signals in cycles by means of light sources provided on the vehicle. The alarm is controlled by a control unit that contains a separate clock generator for clocking the light sources via lines, in the event of an alarm.

An anti-theft alarm, which usually generates acoustic alarm signals by means of a horn or the like, can be coupled to the hazard warning system of a vehicle so that additionally, intermittent optical alarm signals are generated by means of the vehicle indicator lights. The vehicle issuing the alarm can thus be better located, especially in darkness.

An anti-theft alarm which operates in a corresponding manner is known from German Patent Document DE 38 10 806 Cl. The control unit contains a clock generator which, for an alarm, intermittently operates all the vehicle indicator lights via a control unit double contact relay that is switched over for a limited time. It is not disclosed in this German Patent Document how this device interacts with the normal hazard warning system. The publication also contains no information relating to the relationship of the flashing frequencies in the hazard warning mode and in the alarm mode of the indicator lights, and does not contain information on how the relationship could be adjusted.

One problem in this respect is that specific countries require different flashing speeds for the hazard warning mode and for the alarm mode. This serves above all to distinguish between break-down situations in which the hazard warning system has to be switched on manually and the above described alarm cases in which unauthorized attempts at access are being signalled. In the European Community, doubling the frequency of the hazard warning mode is prescribed for the case of an alarm. In Japan, a single frequency is admissible. Also, Switzerland uses a continuous audible tone while the European community uses intermittent alarm tones.

The alarm state is usully maintained for a limited amount of time (max. 5 minutes) and is continuously retriggered during unauthorized driving. For example, actuating the brakelight switch each time the brakes are actuated or actuating other electrical loads in the vehicle can retrigger the alarm. However, stolen vehicles which are driven with the alarm system activated should be roadworthy. In other words, it must still be possible for the normal driving direction indicator signals and hazard warning signals to be generated. Under certain circumstances, the indicator lights activated by the anti-theft alarm could light up with an undefined rhythm when the normal flashing system is switched on because of two different load-dependent flasher generators whose load-dependent function is disturbed by the externally supplied voltage levels. Other light sources, which, depending on countries' regulations, may also be operated by means of an anti-theft alarm, for example headlights and rear lights, should also be capable of being switched on normally even during unauthorized driving.

A combination driving direction indicator and hazard warning device for motor vehicles is described in German Patent Document DE 36 30 448 Cl. A driving direction indicator signal can be randomly superimposed on the hazard warning mode by the actuation of the driving direction indicator switch, this hazard warning mode having been randomly switched on, for example, when a vehicle is being towed away.

An interrelation with an anti-theft alarm which can also trigger a (modified) hazard warning mode, is not disclosed in the aforesaid publication. In some vehicles, a microprocessor-controlled flasher generator (time function relay) is used to provide different flashing frequencies. With the aid of a special control input on the flasher generator connected to the control unit of the anti-theft alarm, a control signal issued by the unit in the event of an alarm can be appropriately evaluated and can trigger the alarm flashing mode at increased frequency, while in hazard warning mode the usual, series-produced hazard warning switch in the vehicle is used.

Furthermore, a separate clock relay is used in this system on each side of the vehicle for the respective indicator lights so that the superimposition of driving direction indicator signals, already mentioned, is made possible by means of hazard warning signals. The anti-theft control unit here does not contain a separate clock generator, but instead is realized by means of a time function relay.

However, for reasons of cost and assembly it would be advantageous to be able to use a conventional hazard warning system with a simple load-controlled clock generator with a relay for the application outlined above together with an anti-theft alarm without having to provide a special anti-theft input. It is known in conventional systems of this kind to switch the hazard warning mode by connecting all the indicator lights on both sides of the vehicle simultaneously to the clock generator via the hazard warning switch. By means of such a measure, preliminary operations for possible installation of an anti-theft alarm as an optional extra during manufacture of the vehicle can be dispensed with.

The invention has as an object to provide a circuit for an anti-theft alarm in a manner so that even when the alarm is triggered, it is possible to drive in a manner which is safe in relation to the safety of other motorists and with respect to the optical signals emitted.

According to the present invention, a circuit arrangement of an anti-theft alarm for a vehicle has light sources which are activatable via the circuit arrangement and via externally supplied electrical signals. The circuit arranement has a control unit with a clock generator for intermittently and cyclically activating the light sources via lines upon detection of an alarm and with control logic for detecting an externally supplied electrical signal occurring on the lines and for suppressing the cyclical activating of the light sources with the clock generator for a predetermined amount of time.

Although the vehicle light sources provided for this purpose are cyclically clocked by the anti-theft alarm control unit in the event of an alarm, at least in the dark phase of the clock cycles the control unit monitors the lines to the light sources which can also be activated via other switches, in particular the driving direction indicator switch or the hazard warning switch. In the simplest manner (plausibility test), it can be concluded by detecting a positive voltage level occurring in the dark phase of each alarm flashing cycle on a line to the light sources that the voltage level is being externally supplied and thus one of the other switches mentioned has been closed.

If, on the other hand, the lines are continuously monitored, that is to say also in the light phase, by making a comparison between the time of the signal occurring and an alarm-conditioned clocking, which is usually switched by a relay, self-inhibiting of the alarm flashing is excluded. This can be realized by logical connection of electrical signals.

As soon as an externally supplied signal is present, the anti-theft alarm control unit withdraws from the light source circuit for a predetermined time period so that in the interest of safety of other motorists, the other switched-on switch is given priority. In the customary case of optional alarm clocking of the driving direction indicator lights, opposing clocking of two different clock generators is reliably prevented without additional intervention into the driving direction indicator clock generator present being required. The clock generator can thus be of very simple design while the necessary circuit measures can be displaced into the area of the anti-theft alarm which can be supplied as an optional extra.

Of course, other equally valid methods for signal detection can also be applied. For example, a current which flows to the light sources in the dark phase could also indicate externally supplied signals.

With an anti-theft alarm control unit of the type proposed here containing a microprocessor ($\mu$P), it is also possible to fulfill the different requirements relating to the flashing frequency of the optical alarm signals without additional hardware. With appropriate programming of the $\mu$P, the desired flashing frequency can be stipulated to the microprocessor via a pin set/cable set encoding which is performed externally at the control unit. For example, by means of two terminal pins which optionally remain free or are connected to earth, four different stipulations can be made. At the same time, in the case of possible retrofitting of a vehicle, it is not necessary to carry out any hardware changes in the control unit itself or even to replace it. These features only come to bear in the software of the $\mu$P and in an external changing of the code.

Other objects, advantages and novel features of the present invention will become apparent from the following detailed description of the invention when considered in conjunction with the accompanying drawings.

DETAILED DESCRIPTION OF THE DRAWINGS

Figure 1:
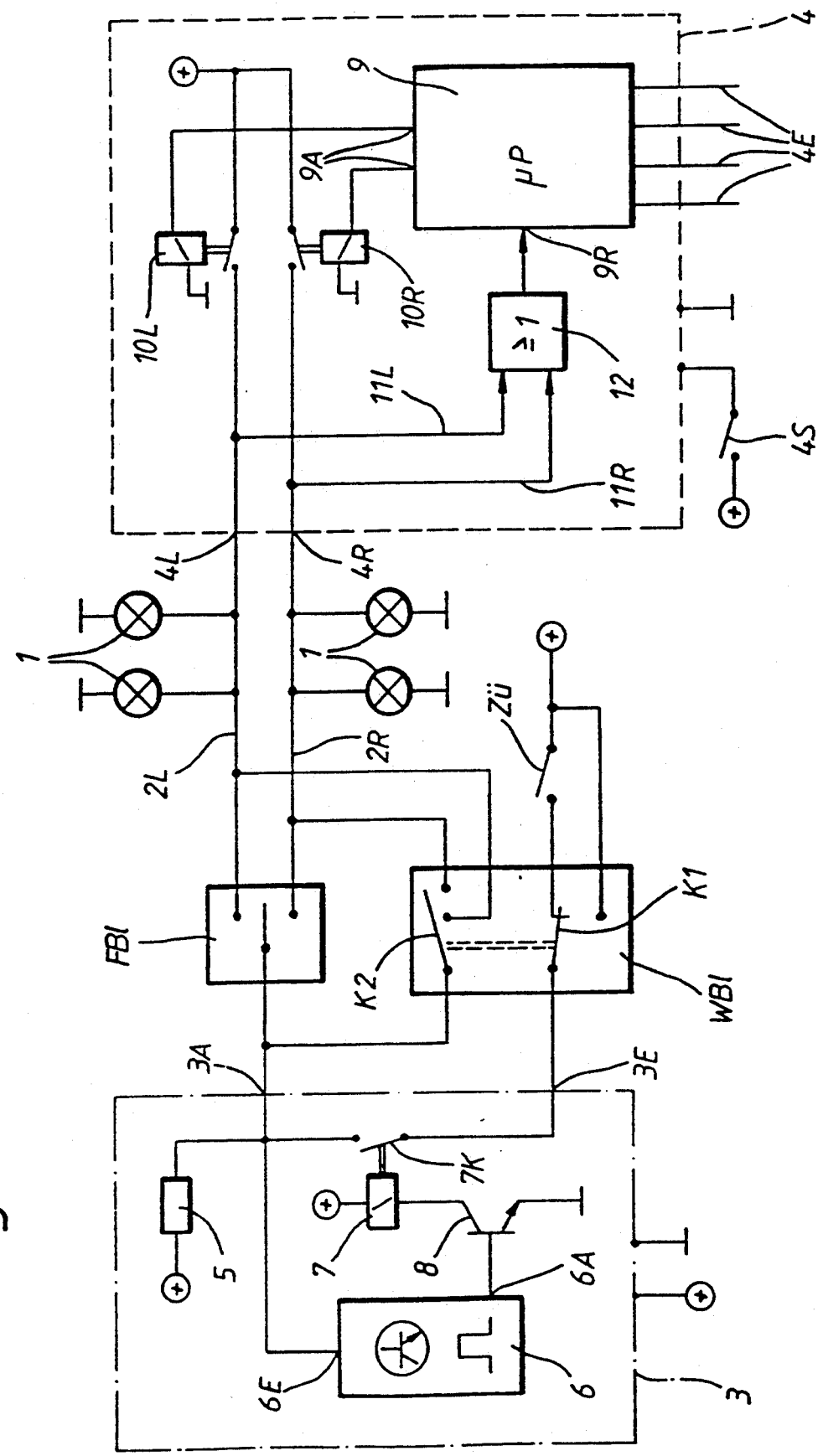
FIG. 1 in an overall circuit diagram of the arrangement, constructed in accordance with an embodiment of the present invention.

Referring to FIG. 1, vehicle light sources 1 are provided as indicator lights of a driving direction indicator and hazard warning system which can be electrically connected to an output 3A of a flasher control unit 3 via lines 2R and 2L, respectively, which are separated according to vehicle sides. The lines 2R, 2L are separately connected to both a driving direction indicator switch FB1, and to a hazard warning switch WB1. The lines 2R and 2L are also permanently connected to outputs 4R and 4L, respectively, of a control unit 4 of an electronic anti-theft alarm. The hazard warning switch WB1 has, in a known manner, a first contact K1 which can be switched (over) and connects an input 3E of the flasher control unit 3 to positive potential from the vehicle's electrical system either via an ignition switch Zu or directly. WB1 also has a second contact K2 which can only be switched together with the contact K1 and connects the two lines 2R and 2L to the output 3A of the flasher control unit 3 for the hazard warning mode. In the DIN motor vehicle electronic nomenclature the two input terminals of the hazard warning switch WB1 correspond to terminals KL.15 and KL.30, respectively, the input 3E of the flasher control unit 3 to the terminal KL.49 and its output 3A to the terminal KL.49a.

The driving direction indicator switch FB1 which is connected in parallel with the contact K2, is a changeover contact with a central position which can only connect in each case one of the two lines 2R or 2L to the output 3A of the flasher control unit 3 and thus switches on the light sources 1 to generate driving direction indicator signals. Positive potential is constantly connected to the output 3A via a high-impedance resistor 5. In addition, a control input 6E of a clock generator 6 is electrically connected to the output 3A. The input 3E of the flasher control unit 3 can be connected to the output 3A via a switch contact 7K of a relay 7, the relay 7 being clocked by a switching transistor 8 and a clock output 6A of the load-dependent clock generator. Clocking occurs when the potential is drawn to ground at the output 3A by actuating the driving direction indicator switch FB1 or the second contact K2 of the hazard warning switch WB1 via the low impedance light sources 1.

The control unit 4 has an external voltage supply which can be switched on via a switch 4S which serves to activate the anti-theft alarm. The line 2R is connected to a clock output 4R and the line 2L to a clock output 4L of the control unit 4. The control unit 4 has additional inputs 4E which are connected in a known manner to signal generators (not shown) for triggering the alarm after activation. These usually also include signals which are repeatedly actuated during driving, for example a brake light switch. In the case of unauthorized driving, where the alarm condition is maintained or renewed, the control unit 4 is repeatedly activated despite the alarm being automatically cancelled after a relatively short time in accordance with regulations. The control unit 4 may also provide a signal to an acoustic generator, such as the vehicle horn (not shown). The acoustic function remains otherwise unaffected by the alarm signal suppression described here. By switching off the power supply of the control unit at the switch 4S, an alarm can be cancelled at any time. However, in order to actuate the switch 4S a key must usually be used which is not available to unauthorized persons.

The control unit 4 comprises a central microprocessor 9 which, for an alarm condition, intermittently activates a relay 10R or 10L via an output 9A. The activation frequency is determined by software and thus is easily modified. The two relays 10R and 10L each possesses a switch contact via which the lines 2R and 2L to the light sources 1 can be connected to the positive potential of the vehicle voltage source. It is also possible to replace the two relays 10R and 10L with their single switch contacts by a double contact relay. The activation of the relays is illustrated here in simplified form. Often, amplifiers or drivers are provided between the microprocessor and the relays. Instead of the relays or relay, suitable semiconductor switches can also be used. Furthermore, the microprocessor 9 usually has a separate continuous voltage supply to maintain the contents of its memory it being however ensured that this supplied microprocessor cannot trigger a false alarm. The electrical potential which is supplied in each case to the lines 2R and 2L is fed back to the microprocessor via branch lines 11R and 11L of the lines. The microprocessor 9 only needs one feedback input 9R for the application described here, the two branch lines 11R and 11L being combined upstream of the input 9R at an OR element 12.

Figure 2:
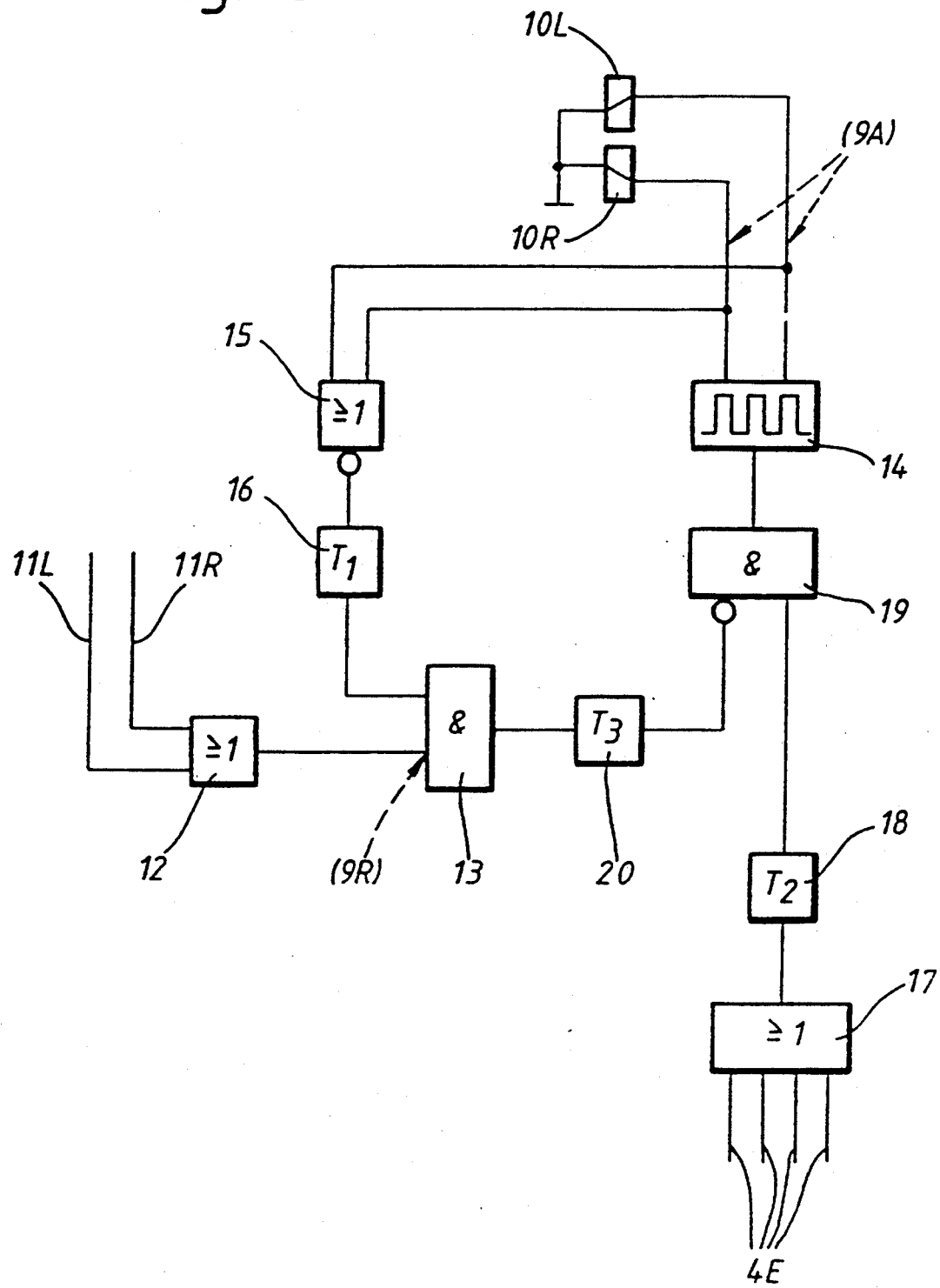
FIG. 2 shows circuit outline with logic elements for signal evaluation as a detail of the arrangement of FIG. 1.

In FIG. 2, an exemplary embodiment of an evaluation circuit is outlined in order to clarify the function of the feedback, with which circuit the alarm signals of the light sources 1 can be suppressed within the control unit 4 for the sake of signalling driving direction changes.

The branch lines 11R and 11L are indicated in FIG. 2. The output of the OR element 12 is connected to an input of an AND gate 13, which corresponds to the feedback input 9R of the microprocessor 9 in FIG. 1.

The relays 10R and 10L are also indicated in FIG. 2 by their drives only, and are connected to a clock generator 14 via drivers (not illustrated). The clock generator 14 can be implemented by software of the microprocessor 9. The terminals of the relays 10R, 1OL to the clock generator 14 correspond to the outputs 9A of the microprocessor 9 in FIG. 1. In turn, branch lines branch between the clock generator 14 and the relay and are combined at an OR element 15. The output signal of the OR element 15 is inverted and applied via a timing element 16 to a further input of the AND element 13. The timing element 16 with the time constant T1 is illustrated herein as a slow release, i.e. signal changes at the output of the OR element 15 are only switched to the input of the AND gate 13 after a small delay, for example T1=20 ms. The signal inputs 4E of the control unit 4 are also combined at an OR element 17, via whose output a timing element 18 (timing constant T2 equals, for example, 5 min) is triggered as a timing circuit for the optical alarm signals when an alarm condition is present. The output of the timing element 18 is connected to an input of a further AND gate 19 whose output is in turn connected directly to the clock generator 14. The output of the AND gate 13 is connected to a third timing element 20 (timing constant T3) which is connected on the output side to an inverting input of the AND gate 19. The voltage supplies of the logic elements are not illustrated for the sake of simplification.

If an alarm is issued via one or more of the inputs 4E, the timing element 18 is triggered, thereby activating the clock generator 14, and thus the relays 1OR and 1OL, via the AND gate 19. During the light phases of the light sources controlled by the alarm clock generator 14, the output level of the OR element 15 becomes positive and the input, connected downstream, of the AND gate 13 becomes negative because of the inversion, thereby inhibiting the AND gate 13.

In the dark phases of the clock generator 14, the output level of the OR gate 12 can become positive if power is applied to the light sources 1, via some other means (such as switching the driving indicator "on" at the switch FB1) such as actuation of FB1, the turn signal indicator. Absent external actuation of the light sources 1, the output of the OR gate 12 remains low due to the high impedance resistance 5 shown in FIG. 1.

When the output of the OR gate 12 is high, the timing element 20 is triggered and its output becomes positive so that the AND gate 19 provides a low output and the activation of the clock generator 14 is interrupted, irrespective of the state of the timing element 18. Clocking of the light sources 1 is suppressed by the separate control unit clock generator 14 in each case for one cycle of the timing constant T3. The timing constant T3 of the timing element 20 is shorter than that of the timing element 18 and is, for example, one second. However, T3 is always retriggered as long as the output of the OR element 12 provides positive signals. If there is no positive output from the OR gate for a relatively long time, the AND gate 19 can switch through again after the cycle of the timing constants T3 and thus permit again the actuation of the light sources 1 by the anti-theft alarm control unit 4.

The individual components are shown in FIG. 2 only for the sake of clarifying functions. Components of the control unit 4 can be embodied in an integrated fashion by means of hardware and software of the microprocessor 9.

Notwithstanding this, the circuit shown for monitoring the presence of signals of a flasher generator on connecting lines is not restricted to use in conjunction with an anti-theft alarm control unit.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Circuit arrangement for an anti-theft alarm for a vehicle, comprising:
   light sources on said vehicle which are activatable via lines by the circuit arrangement as well as by externally supplied electrical signals;
   and a control unit, that controls the anti-theft alarm, the control unit having a clock generator therein for intermittently and cyclically activating said light sources via said lines upon occurrence of an alarm and having control logic coupled to said lines for detecting an externally supplied electrical signal occurring on said lines and for suppressing the cyclical activating of said light sources with the clock generator for a predetermined amount of time upon the detection of the externally supplied electrical signal.

2. Circuit arrangement according to claim 1, wherein the light sources are driving direction indicator lights of the vehicle.

3. Circuit arrangement according to claim 2, wherein the control unit has two separate clock outputs which are connected via the lines in each case to the driving direction indicator lights of one side of the vehicle and wherein the externally supplied signal can be generated by switching on the driving direction indicator lights.

4. Circuit arrangement according to claim 2, wherein at least one generator provided for activating the anti-theft alarm is an electrical switch, in particular a brake light switch, which can be repeatedly forcibly actuated during driving.

5. Circuit arrangement according to claim 1, wherein the voltage level on the lines is fed back to the control unit via further lines in order to detect externally supplied signals.

6. Circuit arrangement according to claim 1, wherein the control unit includes a microprocessor and the flashing frequency which is prescribed for the light sources by a clock generator integrated into the microprocessor, can be variably set externally.

7. Circuit arrangement according to claim 1, wherein the light sources are driving direction indicator lights of the vehicle.

8. Circuit arrangement according to claim 7, wherein the control unit has two separate clock outputs which are connected via the lines in each case to the driving direction indicator lights of one side of the vehicle and wherein the externally supplied signal can be generated by switching on the driving direction indicator lights.

9. Circuit arrangement according to claim 8, wherein at least one signal generator provided for activating the anti-theft alarm is an electrical switch, in particular a brake light switch, which can be repeatedly forcibly actuated during driving.

10. Circuit arrangement according to claim 3, wherein the voltage level on the lines is fed back to the control unit via further lines in order to detect externally supplied signals.

11. Circuit arrangement according to claim 2, wherein the control unit includes a microprocessor and the flashing frequency which is prescribed for the light sources by a clock generator integrated into the microprocessor, can be variably set externally.

* * * * *